United States Patent [19]

De Wispelaere

[11] Patent Number: 4,947,798

[45] Date of Patent: Aug. 14, 1990

[54] FEED PAN FOR PIGS AND PIGLETS

[75] Inventor: Mark De Wispelaere, Maldegem, Belgium

[73] Assignee: Elite N.V., Maldegem, Belgium

[21] Appl. No.: 370,639

[22] Filed: Jun. 23, 1989

[30] Foreign Application Priority Data

Jul. 4, 1988 [NL] Netherlands ............................ 8801692

[51] Int. Cl.⁵ .......................... A01K 5/00; A01K 39/00
[52] U.S. Cl. ...................................................... 119/53
[58] Field of Search .......................... 119/53, 53.5, 56.1

[56] References Cited

U.S. PATENT DOCUMENTS

| | | | |
|---|---|---|---|
| 2,808,029 | 10/1957 | Geerlings | 119/53 |
| 2,884,899 | 5/1959 | Jackes | 119/53 |
| 3,911,868 | 10/1975 | Brembeck | 119/53 |
| 3,971,340 | 7/1976 | Allen | 119/53 |
| 4,433,641 | 2/1984 | Waite | 119/53 |
| 4,552,095 | 11/1985 | Segalla | 119/53 |
| 4,834,026 | 5/1989 | Brembeck et al. | 119/53 |
| 4,841,912 | 6/1989 | Oswald | 119/53 |

FOREIGN PATENT DOCUMENTS 203561 of 1923 United Kingdom ............... 119/53.5

Primary Examiner—Paul J. Hirsch
Attorney, Agent, or Firm—Richard Bushnell

[57] ABSTRACT

A device for feeding animals, in particular pigs and piglets, comprises a feed pan, a superstructure and feed supply means for supplying feed to the feed pan. The feed supply means which are mainly situated inside an extension piece being part of the superstructure comprise a feed supply pipe, a coaxial closing element and a coaxial rotor. The closing element is movable between an upper position in which it closes the feed supply pipe and a lower position in which it is coupled with the rotor so that it functions as a feed distribution element when the rotor is turned by the snouts of feeding animals. The rotor is provided with vanes. The shape of the vanes is such that during rotation of the rotor the vanes scrape away caking feed. The feed pan and the extension piece are preferably made of polyester concrete.

11 Claims, 4 Drawing Sheets

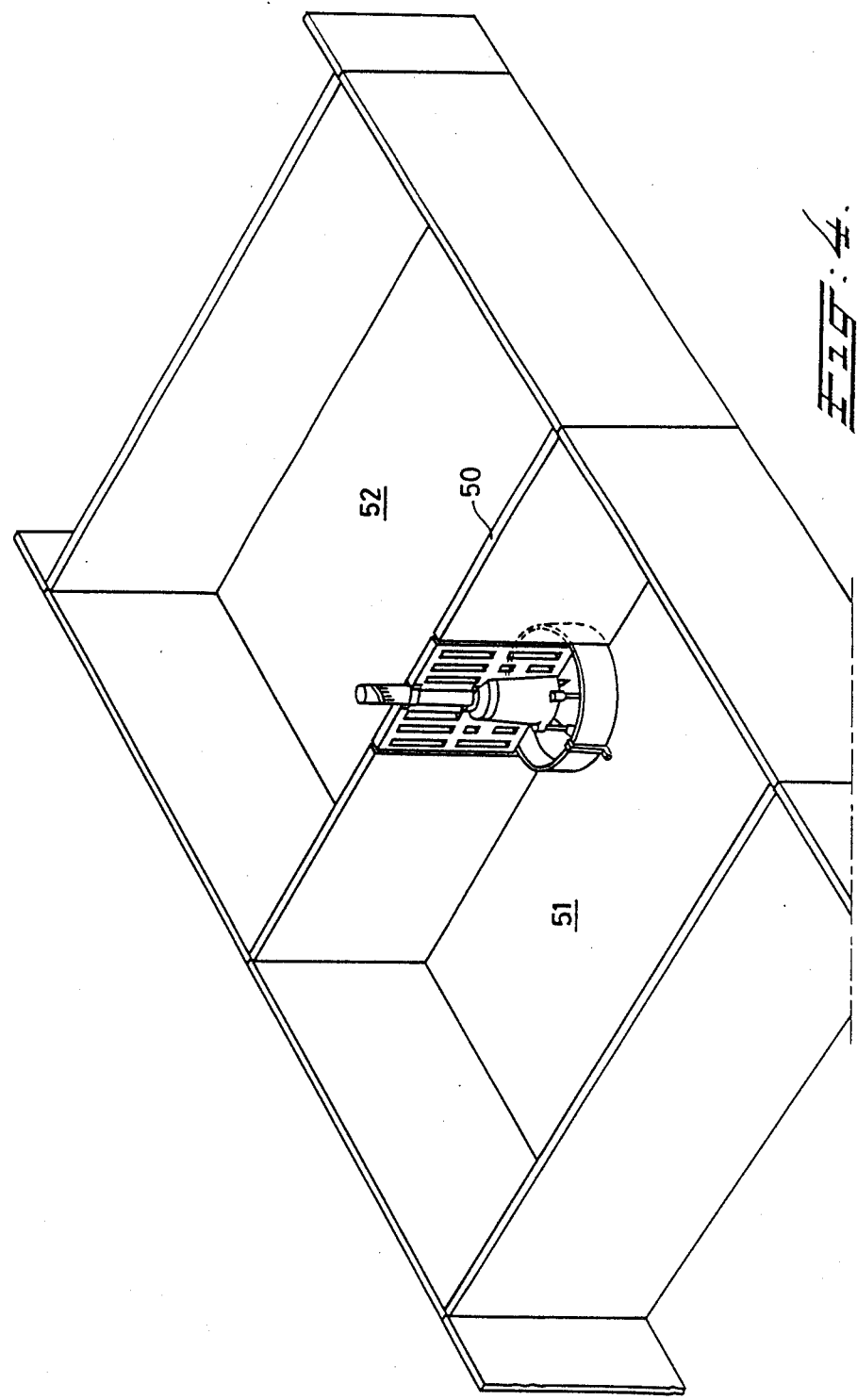

FEED PAN FOR PIGS AND PIGLETS

BACKGROUND OF THE INVENTION

The invention relates in general to a device for feeding animals, in particular pigs and piglets.

French Patent Specification No. 2 563 078 describes such a device which comprises a feed pan, a superstructure fixed on the feed pan and feed supply means for supplying feed to the pan. The round feed pan is provided with a raised peripheral wall and in the center with an elevation in the form of a truncated cone which is approximately the same height as the raised peripheral wall. The superstructure comprises an extension piece situated coaxially above the elevation in the feed pan and is essentially the shape of a largely hollow, round tower which is open at the bottom. The extension piece, which serves as a feed container, rests via a grid of curved bars extending in the radial direction on the peripheral wall of the feed pan. Between the bottom edge of the extension piece and the elevation in the feed pan there is an annular feed fall-out aperture. The feed supply means are located mainly inside the extension piece and comprise a funnel-shaped element which is adjustable in height and which opens coaxially above the elevation in the feed pan at short distance from a rotatable disc situated coaxially between the funnel-shaped element and the elevation and having vanes extending radially through the feed fall-out aperture. During feeding the disc can be rotated by the feeding animals. Through this action feed falling through the funnel shaped element is distributed by the rotating disc into the feed pan. The quantity of feed falling into the feed pan can be regulated by adjusting the height of the funnel-shaped element.

The known device has a number of disadvantages. The feed supply to the feed pan cannot be regulated accurately enough such that on the one hand the animals get always enough feed and on the other hand it is prevented that too much feed falls into the feed pan and feed is spilt. This is, among other things, due to the fact that the opening in the bottom of the funnel-shaped element cannot be closed completely, the adjustment of the height of the funnel-shaped element is difficult, particularly when the extension piece is filled with feed, the rotor can be turned inadvertently by the animals while they are eating, and the rotor can get stuck by caking of the feed. Besides, both the production and the maintenance costs of the known device will be high.

SUMMARY OF THE INVENTION

The object of the present invention is to provide a device for feeding animals with which the correct amount of feed is always present in the feed pan during feeding.

This object is achieved according to the invention by a device for feeding animals, in particular pigs and piglets, comprising a feed pan, a superstructure fixed on the feed pan and feed supply means for supplying feed to the feed pan, the feed pan being provided with a raised peripheral wall and in the center with an elevation in the form of a truncated cone, the superstructure comprising an extension piece situated coaxially above the elevation and being essentially the shape of a largely hollow, round tower which is open at the bottom, such that between the bottom edge of the extension piece and the elevation there is an annular feed fall-out aperture, and the feed supply means being located mainly inside the extension piece and comprising a feed supply channel which opens coaxially above the elevation and a rotor situated coaxially between the feed supply channel and the elevation and having vanes extending radially through the feed fall-out aperture, which device is characterized in that the feed supply means further comprise a closing element situated coaxially between the feed supply channel and the rotor, said closing element being rotatable about its axis and being movable in the axial direction between an upper position in which it rests against the bottom end of the feed supply channel and closes said channel, while it lies free from the rotor, and a lower position at distance from the bottom end of the feed supply channel, in which the closing element opens the feed supply channel and is coupled to the rotor so that the closing element can function as a rotating feed distribution element.

In the feeding device according to the invention the feed supply channel can be closed completely in which situation rotation of the rotor has no effect on the feed supply. During feeding a regular flow of feed into the feed pan is achieved.

Preferred embodiments of the device according to the invention are defined in various sub-claims and described in the following description with reference to the drawings.

BRIEF DESCRIPTION OF THE DRAWINGS

FIG. 4 shows the device according to the invention situated at the partition between two neighbouring pens.

DETAILED DESCRIPTION OF THE PREFERRED EMBODIMENTS

Figure 1:
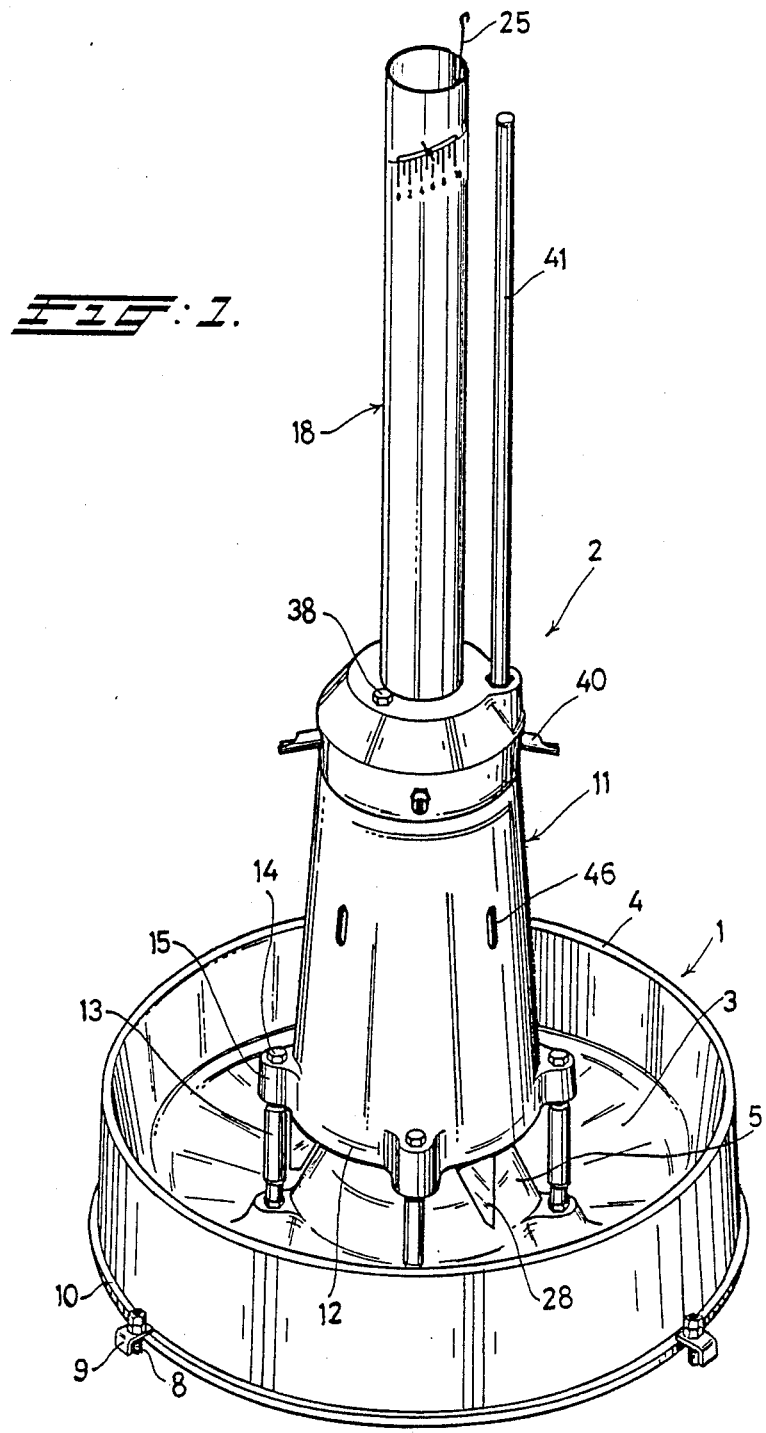
FIG. 1 is a view in perspective of a feeding device according to the invention.
Figure 2:
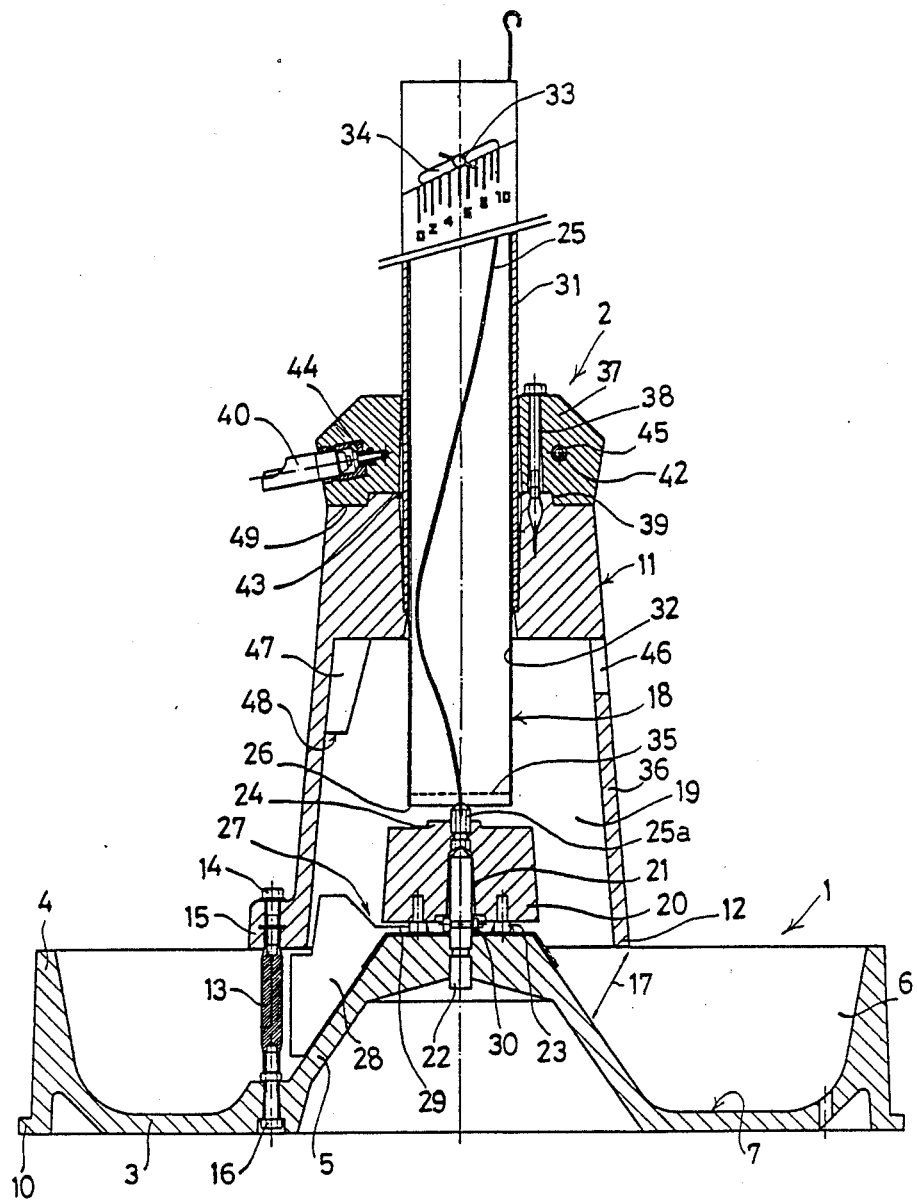
FIG. 2 is a view in cross section along the axis, and on an enlarged scale, of the device of FIG. 1.
Figure 3:
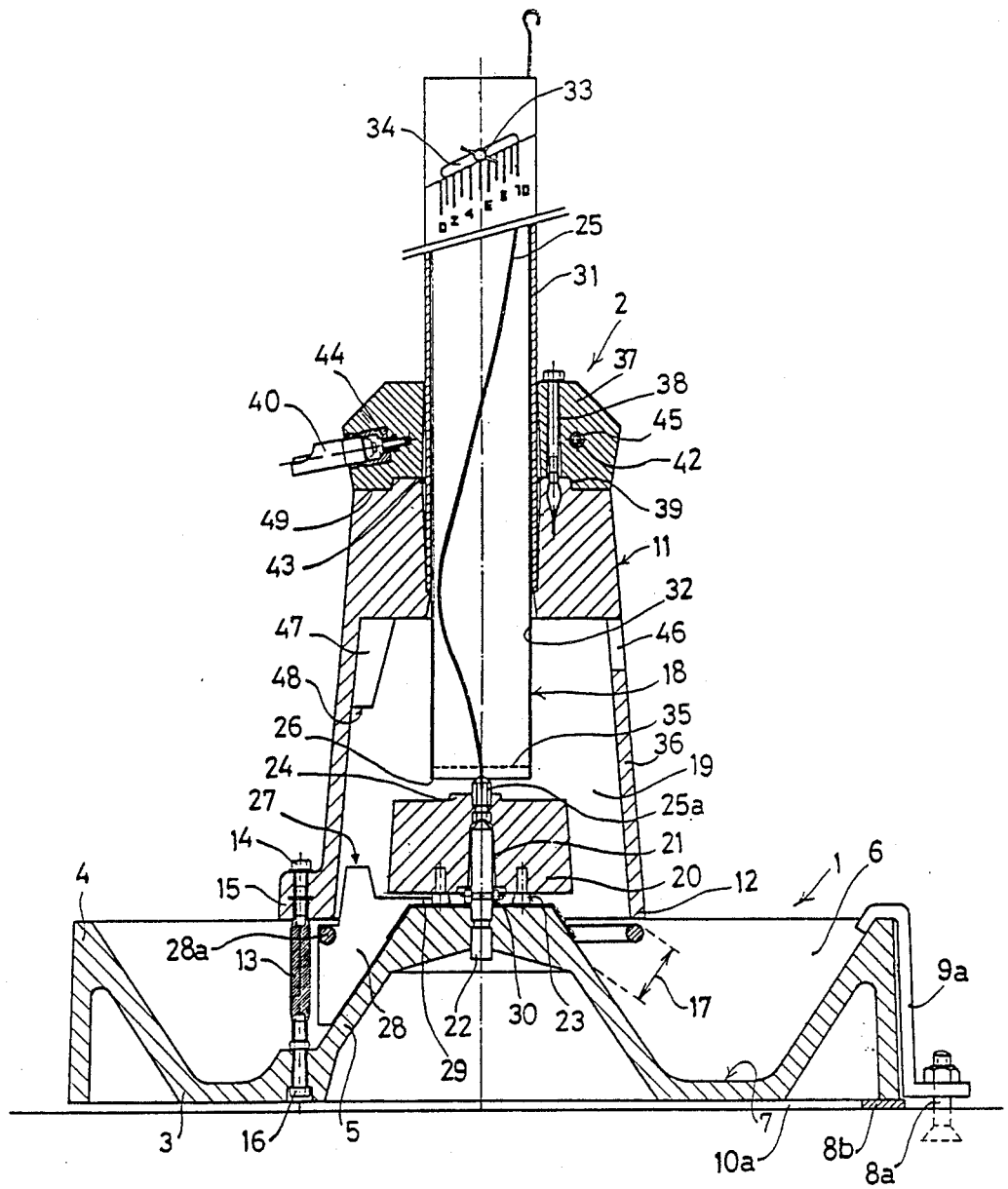
FIG. 3 is a view similar to FIG. 2 of a slightly modified version of the device according to the invention.

The device shown in the drawings for the feeding of animals, in particular pigs and piglets, comprises the following two main parts: a feed pan 1 and a superstructure 2 which is fixed on the feed pan 1 and bears means for supplying feed to the feed pan. The feed pan 1 is round in shape and is provided with a bottom 3, a raised peripheral wall 4, and an elevation 5 in the shape of a truncated cone disposed in the center. The feed pan 1 is thus essentially the shape of an annular through 6, on the bottom 7 of which the feed comes to rest. The raised peripheral wall 4 may be at a different angle with respect to the bottom 3 as is shown in FIGS. 2 and 3. The feed pan 1 can be fixed to a sty floor by means of a number of clamping bolts 8 and clamping brackets 9 which mate with them and engage over a projecting flange 10 formed on the bottom edge of the pan, as shown in FIG. 2, or by means of a number of clamping bolts 8a and clamping brackets 9a which engage over the top edge of the peripheral wall 4 of the pan, as shown in FIG. 3. Rubber pads 8b can be provided near the bolts 8a between the lower outer edge of the feed pan 1 and the sty floor, indicated by 10a in FIG. 3, in order to be able to fix the feed pan 1 properly, also when the sty floor 10a is uneven.

The superstructure 2 comprises an extension piece 11 situated centrally above the pan. This extension piece is essentially the shape of a round tower which is largely hollow and is open at the bottom. The diameter of the extension piece 11 at the bottom is approximately the same as the diameter of the elevation 5 in the feed pan 1 at the bottom 3. The extension piece 11 rests with its bottom side near the bottom edge 12 on a number of legs 13 extending upwards from the bottom 3 of the feed pan. Each leg 13 is fixed to the extension piece by a bolt 14 by means of a boss 15 projecting from the outside wall of the extension piece, and is connected to the floor of the feed pan 1 by a bolt 16. The extension piece is thereby easy to fit and remove. In the embodiment shown the extension piece is resting on four legs 13. The height of the legs is such that the bottom edge of the extension piece lies at approximately the same height as the top side of the raised edge 4 of the pan 1 and the top side of the elevation 5.

Between the bottom edge 12 of the extension piece 11 and the outside of the elevation 5 there is an annular feed fall-out aperture 17 through which the feed supplied through a feed supply pipe 18 passes into the feed pan 1. This feed supply pipe 18 is disposed coaxially in the top part of the extension piece 11 and opens into the hollow space 19 in the extension piece 11 some distance away from the top side of the elevation 5 in the feed pan 1.

The feed supply pipe 18 can be closed off at the bottom side by means of a closing element 20 in the form of a thick round disc. The closing element is rotatable about its axis and can be moved in the axial direction. For this, the closing element is provided in the middle with a slightly conical bore 21 extending from the bottom side towards the top and beared in this bore on a pin 22 which extends coaxially upwards from the top side of the elevation 5 in the feed pan 1 and is fixed in the elevation 5. The closing element 20 is rotatable about said pin 22 and slidable in the axial direction. A short pin 25a is fitted in the closing element on the top side at the bore 21. In the lower position of the closing element shown in FIGS. 2 and 3, the lower face of the short pin 25a rests on the pointed top of the pin 21, such that a bearing for the rotatable closing element is formed. Feed will not enter the bore 21, so that the bearing of the closing element 20 will not be contaminated and the closing element will not get jammed and always be able to rotate freely around the pin 22.

The closing element 20 is provided on the bottom side with projecting bosses 23. On the top side the closing element is provided with an elevation 24, which is triangular viewed from the top. A wire 25 running through the feed supply pipe 18, by means of which the closing element can be moved up and down, is fixed to the closing element 20. In the embodiments shown the wire 25 is connected to the closing element 20 by means of the short pin 25a.

When the feed supply is closed the closing element 20 is pulled against the bottom end 26 of the feed supply pipe 18 by means of the wire 25, thus closing the pipe 18. When the feed supply is open, the closing element 20 lies a distance away from the feed supply pipe 18, so that feed can flow out of the pipe 18. In this position the closing element serves as a feed distribution element, the closing element being rotated about its axis.

The triangular elevation 24 provides an effective sideward movement of the feed. The elevation need not be triangular. It may also have other shapes, for example square or star-shaped. Important is that it provides a sideward movement of the feed.

For the rotation of the closing element 20 a rotor 27 resting on the top side of the elevation 5 and being rotatable over this elevation is provided, said rotor comprising a number of control elements connected to each other and having the form of vertical vanes 28 extending radially through the feed fall-out aperture. These vanes 28 are of such a shape that during the rotation of the rotor 27 they move closely along the external surface of the elevation 5, the bottom edge 12 of the extension piece 11 and the legs 13, thus preventing caking of feed. In the embodiment shown the rotor is provided with three of such vanes 28. The rotor can be made freely rotatable through 360°. It is, however, also possible to make the rotor rotatable through only a limited angle between 0° and 360°.

During feeding, the animals can set the vanes 28 of the rotor 27 in motion with their snouts, thus causing the rotor to rotate. Since the rotor is provided at the top side with carrier ribs 29 which can drive the projecting bosses 23 at the bottom side of the closing element 20, which during feeding is in the position shown in FIGS. 2 and 3, the closing element 20, also functioning as a feed distribution element, is rotated during the rotation of the rotor 27, and the feed supplied through the pipe 18 is distributed over the periphery and conveyed to the feed fall-out aperture 17. The rotor 27 shown in FIG. 3 is provided with a peripheral ring 28a connected to the vanes 28. The purpose of this ring 28a is to enable the feeding animal or animals to rotate the rotor 27 in any position of the rotor, also when a vane 28 lies just behind a leg 13. To prevent the ring 28a from being pushed downwards by the snouts of the feeding animals by which the rotor 27 may be damaged, the ring 28a is mounted such that it lies closely below the bottom edge 12 of the extension piece 11.

The rotor is limited in its downward movement in the axial direction by means of a stop 30 on the pin 22.

In the closed position of the feed supply the rotor 27 turns freely without taking the closing element 20 with it. This prevents friction and wear, and in this situation the animals can never take out feed from the feed supply pipe 18 through some movement or other.

It is pointed out that during the rotation of the closing element 20 the wire 25 serves as a stirring element for the feed present in the pipe 18.

The feed supply pipe 18 is made up of two pipes 31 and 32 sliding telescopically into each other. The outer pipe 31 is fixed coaxially in the top part of the extension piece 11, and the sliding inner pipe 32 opens into the hollow space 19 in the extension piece 11. The position of the inner pipe 32 relative to the outer pipe 31 is adjustable due to the fact that the inner pipe 32 is provided with a clamping bolt 33 which can move through a slanting slot 34 in the outer pipe 31. The height of the end 26 of the inner pipe can be adjusted by turning the inner pipe 32 relative to the outer pipe 31. In FIGS. 2 and 3 the inner pipe 32 is shown approximately in the central position. The top end position of the bottom end 26 of the inner pipe 32 is indicated by a dotted line 35. This design of the feed supply pipe means that in the open position of the feed supply the size of the feed supply aperture can be set. This setting is not critical and in fact serves only for the adjustment of the feed supply aperture to the type of feed (meal or granules).

The extension piece 11 in the embodiment shown is made up of a central housing 36 in which the hollow space 19 is formed and which rests on the legs 13, and an annular part 37 fixed on the top of the housing and containing a drinking water supply system. The annular part 37 is fixed to the housing 36 by means of bolts 38, the centering taking place by means of a centering edge 39. The shape of the annular part 37 is such that it would be difficult for the animals to stand with their feet on it.

The drinking water supply system has a number of drinking nipples 40 (in this case four) disposed on the side of the annular part 37, a water supply pipe 41 disposed on the top side of the annular part 37, and a connecting channel 42 inside the annular part 37 between the water supply pipe 41 and the drinking nipples 40.

FIGS. 2 and 3 show that the outer pipe 31 of the feed supply pipe 18 is clamped in the top part of the extension piece 11 by means of a rubber ring 43 present between the housing 36 and the annular part 37.

The pan 1, the housing 36, the annular part 37 and the closing element 20 are preferably made of a cast or moulded material. There is a special preference here for polyester concrete, which is easy to cast and is also cheap. The feed supply pipe is preferably made of plastic material.

If the annular part 37 is of cast material, during its production inserts 44 for the connection of the drinking nipples 40 and the water supply pipe 41 and a connecting pipe 45 between the inserts 44 can be cast in.

The wall of the housing 36 can be provided with a number of vent holes 46 distributed over the periphery, and each disposed between two drinking nipples. These vent holes are for discharging the moisture-laden breath of the feeding animals, and thereby prevent the feed from caking and mould from forming.

The top side of the hollow space 19 of the housing 36 can be provided with a number of ribs 47 which ensure that when several housings 36 are stacked in each other they are kept some distance apart, which prevents the slightly conical inner wall of a housing 36 from becoming jammed on the also conical outer wall of another housing 36 projecting into the hollow space 19. The bottom edge 48 of the ribs 47 rests here on the top edge 49 of the housing 36.

The feeding device described can be set up at any point in a pen, in such a way that the animals present in the pen can reach the feeding device on all sides. It is, however, possible to set up the device at the partition 50 between two pens 51 and 52, as shown in FIG. 4, or even at the point of intersection of two partitions, so that animals from two or four neighboring, but separate pens can feed from one feeding device.

In the embodiment of the feeding device described there are no means of separation present to separate the feeding animals from each other.

Recapitulating, the feeding device according to the invention has the following advantages over the known device for feeding animals:

if the main parts of the feeding device are made of polyester concrete or another cast or moulded material, the device is considerably cheaper than the known device, since there are fewer parts, the assembly costs are lower, and expensive material such as stainless steel need not be used;

the regulation of the feed supply via the opening between the feed supply pipe and the shut-off valve can be effected easily and is not critical, the size of the opening only having to be adjusted to the type of feed;

the feed can easily flow through the feed supply pipe to the feed pan;

the rotor turns entirely inside the space which is bounded in the lateral direction by the legs on which the extension piece rests, so that the feeding animals have to set the rotor in motion deliberately when they require feed, which again means that the feed level in the pan during feeding is low and little or no feed is spilt;

the rotor and the other parts of the feed supply device lie inside a fixed housing, so that the chance of damage to these parts is slight, and the structure of the device is sturdy, while it has few projecting parts, which prevents the device from being damaged by feeding animals;

the construction of the feeding device and particularly the rotor is such that caking of the feed is prevented;

the feeding device has no parts by which the feeding animals can be hurt;

the device can be easily dismantled for maintenance;

the device can be used for programmed feeding (in meals) of animals or for a method of feeding in which feed is always available to the animals (ad-lib feeding).

What is claimed is:

1. A device for feeding animals, in particular pigs and piglets, comprising a feed pan, said feed pan being provided with a raised peripheral wall and in the center with an elevation in the form of a truncated cone, a superstructure fixed on the feed pan, said superstructure comprising an extension piece situated coaxially above the elevation and being essentially the shape of a largely hollow, round tower having an outer wall and being open at the bottom, such that between the bottom edge of the extension piece and the elevation there is an annular feed fall-out aperture, and feed supply means for supplying feed to the feed pan, said feed supply means being located mainly inside the extension piece and comprising a feed supply channel which opens coaxially above the elevation and a rotor situated coaxially between the feed supply channel and the elevation and having vanes extending radially through the feed fall-out aperture, said feed supply means further comprising a closing element situated coaxially between the feed supply channel and the rotor, said closing element being rotatable about its axis and being movable in the axial direction between an upper position in which it rests against the bottom end of the feed supply channel and closes said channel, while it lies free from the rotor, and a lower position at distance from the bottom end of the feed supply channel, in which the closing element opens the feed supply channel and is coupled to the rotor so that the closing element can function as a rotating feed distribution element.

2. The device of to claim 1, wherein the closing element is in the form of a thick round disc, which is provided in the middle with a bore which extends upwards from the bottom side, and into which a pin extends coaxially upwards from the top side of the elevation in the feed pan, such that the closing element is rotatable about said pin and slidable along said pin, and the closing element is provided on the bottom side with projecting bosses which can mate with carrier elements disposed on the rotor for rotation of the closing element.

3. The device of claim 1, wherein the closing element is provided on the top side with an elevation, which provides a sideward movement of feed emerging from the feed supply channel and which is preferably triangular viewed from the top.

4. The device of claim 1, wherein the feed supply channel consists of a feed supply pipe made up of two pipes sliding telescopically into each other, of which the outer pipe is fixed coaxially in a top part of the extension piece, and the inner pipe opens with its bottom end into the hollow space in the extension piece, the position of the inner pipe relative to the outer pipe, and thus the size of the opening between the bottom end of the inner pipe and the closing element, is adjustable when the closing element is in its lower position.

5. The device of claim 1, wherein the rotor rests on the top side of the elevation and the shape of the vanes of the rotor is such that during rotation of the rotor the vanes move closely along the external surface of the elevation, the bottom edge of the extension piece, thus preventing caking of feed.

6. The device of claim 5, wherein the rotor is provided with a peripheral ring connected to the vanes, the ring being mounted on the rotor such that it lies closely below the bottom edge of the extension piece.

7. The device of claim 1, wherein the outer wall of the extension piece is provided with a number of vent holes.

8. The device of claim 1, wherein the the extension piece rests with the bottom side near the bottom edge on a number of legs extending upwards from the bottom of the feed pan, and the radial dimensions of the vanes of the rotor are such that during rotation of the rotor the vanes move closely along the legs.

9. The device of claim 8, wherein the the extension piece is made up of a central housing in which a hollow space is formed and which rests on the legs extending from the bottom of the feed pan, and an annular part fixed on the top of the housing and containing a drinking water supply system, and a number of inserts for the connection of drinking nipples and a water supply pipe, and also a connecting pipe between the inserts.

10. The device of claim 1, wherein the feed pan and the extension piece are essentially of a cast or moulded material.

11. Sty provided with at least one device for feeding animals, in particular pigs and piglets, the at least one feeding device being set up in a pen, at the partition between two pens or at the intersection of two such partitions, and comprising a feed pan, said feed pan being provided with a raised peripheral wall and in the center with an elevation in the form of a truncated cone, a superstructure fixed on the feed pan, said superstructure comprising an extension piece situated coaxially above the elevation and being essentially the shape of a largely hollow, round tower having an outer wall and being open at the bottom, such that between the bottom edge of the extension piece and the elevation there is an annular feed fall-out aperture, and feed supply means for supplying feed to the feed pan, said feed supply means being located mainly inside the extension piece and comprising a feed supply channel which opens coaxially above the elevation and a rotor situated coaxially between the feed supply channel and the elevation and having vanes extending radially through the feed fall-out aperture, said feed supply means further comprising a closing element situated coaxially between the feed supply channel and the rotor, said closing element being rotatable about its axis and being movable in the axial direction between an upper position in which it rests against the bottom end of the feed supply channel and closes said channel, while it lies free from the rotor, and a lower position at distance from the bottom end of the feed supply channel, in which the closing element opens the feed supply channel and is coupled to the rotor so that the closing element can function as a rotating feed distribution element.

* * * * *